US009125258B2

United States Patent
Lee (10) Patent No.: US 9,125,258 B2
(45) Date of Patent: Sep. 1, 2015

(54) LIGHT SOURCE DRIVING APPARATUS, LIGHT SOURCE DEVICE INCLUDING THE SAME AND LIGHT SOURCE DRIVING METHOD OF THE LIGHT SOURCE DRIVING APPARATUS

(71) Applicant: SAMSUNG ELECTRONICS CO., LTD., Suwon-si (KR)

(72) Inventor: Bong Jin Lee, Hwaseong (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 338 days.

(21) Appl. No.: 13/869,647

(22) Filed: Apr. 24, 2013

(65) Prior Publication Data
US 2014/0042905 A1   Feb. 13, 2014

(30) Foreign Application Priority Data

Aug. 10, 2012 (KR) ........................ 10-2012-0087934

(51) Int. Cl.
*H01J 1/52* (2006.01)
*H05B 33/08* (2006.01)

(52) U.S. Cl.
CPC ........ *H05B 33/0809* (2013.01); *H05B 33/0887* (2013.01); *H05B 33/0815* (2013.01)

(58) Field of Classification Search
CPC ...................................................... H01J 29/003
USPC ............................................................ 315/85
See application file for complete search history.

(56) References Cited

U.S. PATENT DOCUMENTS

2012/0200229 A1* 8/2012 Kunst et al. .................. 315/186

FOREIGN PATENT DOCUMENTS

JP        2003-169474 A     6/2003
KR        10-2010-0043441 A 4/2010

* cited by examiner

*Primary Examiner* — Daniel Puentes
(74) *Attorney, Agent, or Firm* — Sughrue Mion, PLLC (57) ABSTRACT

Provided are a light source driving apparatus, a light source device including the same, and a light source driving method. The light source driving apparatus includes: a first external input terminal and a second external input terminal; a thermistor with an end connected to the first external input terminal; a discharge resistor with an end connected to the second external input terminal; and a switch which selectively connects, according to a control signal, another end of the discharge resistor to another end of the thermistor or the first external input terminal to the other end of the thermistor.

20 Claims, 5 Drawing Sheets

LIGHT SOURCE DRIVING APPARATUS, LIGHT SOURCE DEVICE INCLUDING THE SAME AND LIGHT SOURCE DRIVING METHOD OF THE LIGHT SOURCE DRIVING APPARATUS

CROSS-REFERENCE TO RELATED APPLICATION

This application claims priority from Korean Patent Application No. 10-2012-0087934, filed on Aug. 10, 2012 in the Korean Intellectual Property Office, the disclosure of which is incorporated herein by reference in its entirety.

BACKGROUND

1. Field

Aspects of exemplary embodiments relate to a light source driving apparatus, a light source device including the same, and a light source driving method.

2. Description of the Related Art

A light emitting diode (LED) is a semiconductor device capable of emitting light of various colors through changes in compound semiconductor materials such as GaAs, AlGaAs, GaN, InGaInP, and the like when included in a light emitting source. Since LEDs have superior monochromic peak wavelengths and improved light emission efficiency as well as being miniaturizable, environmentally-friendly, and having relatively low levels of power consumption, LEDs have a wide range of applications in devices and appliances such as TVs, computers, illumination devices, vehicles, and the like. Furthermore, the applications of LEDs are gradually being extended.

In order to drive a light emitting device using an LED, a separate power supply device is used. As a power supply device generating and supplying driving power for LED illumination devices and the like, a switching mode power supply (SMPS) or the like may be used. A general illumination device uses commercial alternating current (AC) power (e.g., 220V), and does not use a separate power supply device, while a light emitting device using an LED uses direct current (DC) power so that a separate power supply device is used in order to rectify commercial AC power to DC power and convert the rectified DC voltage to have a desired DC voltage level. In line with the development of high efficiency, high output light emitting devices applied to illumination devices and the like, the development of a high efficiency SMPS is demanded for the driving thereof.

SUMMARY

An aspect of an exemplary embodiment provides a light source driving apparatus achieving high power efficiency with a simplified structure.

An aspect of the present invention also provides a light source device having improved high power efficiency, and capable of being stably driven.

According to an aspect of an exemplary embodiment, there is provided a light source driving apparatus, including: a first external input terminal and a second external input terminal; a thermistor with an end connected to the first external input terminal; a discharge resistor with an end connected to the second external input terminal; and a switch which selectively connects, according to a control signal, another end of the discharge resistor to another end of the thermistor or the first external input terminal to the other end of the thermistor.

The first external input terminal and the other end of the thermistor may be open in response to the switch connecting the other end of the discharge resistor to the other end of the thermistor, and the other end of the discharge resistor to the other end of the thermistor may be open in response to the switch connecting the first external input terminal to the other end of the thermistor.

The switch may connect the first external input terminal to the other end of the thermistor in a normal state, thereby allowing the thermistor and the discharge resistor to be disconnected from an external power source.

The switch may connect the other end of the discharge resistor to the other end of the thermistor in response to a voltage of power input through the first external input terminal and the second external input terminal being equal to or lower than a reference voltage.

The light source driving apparatus may further include an electromagnetic interference (EMI) filterer connected to the first external input terminal and the second external input terminal.

The EMI filterer may include a capacitor connected between the first external input terminal and the second external input terminal, and the capacitor may be connected in parallel to the discharge resistor according to an operation of the switch.

The light source driving apparatus may further include a power converter connected to the first external input terminal and the second external input terminal.

The power converter may include a rectifier and a DC-DC converter connected in parallel to each other between the first external input terminal and the second external input terminal.

The DC-DC converter may be a power factor correction (PFC) converter.

The light source driving apparatus may further include a switch controller connected to the first external input terminal and the second external input terminal and which controls an operation of the switch.

The switch controller may include: a comparator which compares a reference signal with a detection signal detected from a voltage input through the first external input terminal and the second external input terminal, and which generates the control signal according to the comparing; and a relay circuit which controls the switch according to the control signal generated in the comparator.

The light source driving apparatus may further include a power converter connected to the first external input terminal and the second external input terminal, wherein the detection signal may have a form of voltage divided by a plurality of resistors connected to an output terminal of the power converter.

The light source driving apparatus may further include an output capacitor connected in parallel to the switch controller, wherein the switch controller may control an operation of the switch according to a level of voltage charged in the output capacitor.

The switch may be a relay switch.

According to an aspect of another exemplary embodiment, there is provided a light source device including: a light source driving apparatus including: a first external input terminal and a second external input terminal, a thermistor with an end connected to the first external input terminal, a discharge resistor with an end connected to the second external input terminal, and a switch selectively connecting, according to a control signal, another end of the discharge resistor to another end of the thermistor or the first external input terminal to the other end of the thermistor; and a light source driven by power output from the light source driving apparatus and including at least one light emitting diode (LED).

According to an aspect of another exemplary embodiment, there is provided a light source driving method of a light source driving apparatus including a first external input terminal, a second external input terminal, a thermistor with an end connected to the first external input terminal, a discharge resistor with an end connected to the second external input terminal, and a switch, the method including: connecting, by the switch, another end of the discharge resistor to another end of the thermistor in response to a first control signal for controlling a connection between the other end of the discharge resistor to the other end of the thermistor; and connecting, by the switch, the first external input terminal to the other end of the thermistor in response to a second control signal for controlling a connection between the first external input terminal to the other end of the thermistor.

BRIEF DESCRIPTION OF THE DRAWINGS

The above and other aspects, features and other advantages will be more clearly understood from the following detailed description taken in conjunction with the accompanying drawings, in which.

DETAILED DESCRIPTION OF EXEMPLARY EMBODIMENTS

Exemplary embodiments will now be described in detail with reference to the accompanying drawings.

Exemplary embodiments may, however, be embodied in many different forms and should not be construed as being limited to exemplary embodiments set forth herein. Rather, these exemplary embodiments are provided so that this disclosure will be thorough and complete, and will fully convey the scope of the inventive concept to those skilled in the art.

In the drawings, the shapes and dimensions of elements may be exaggerated for clarity, and the same reference numerals will be used throughout to designate the same or like elements.

Figure 1:
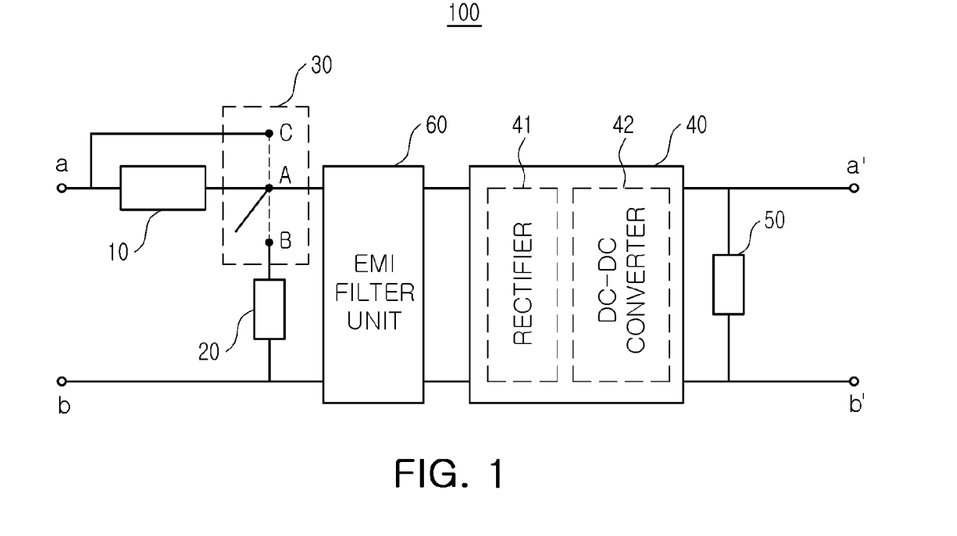
FIG. 1 is a schematic diagram illustrating a light source driving apparatus according to an exemplary embodiment.

FIG. 1 is a schematic diagram illustrating a light source driving apparatus 100 according to an exemplary embodiment.

With reference to FIG. 1, a light source driving apparatus 100 according to an exemplary embodiment may include a first external input terminal a, a second external input terminal b, a thermistor 10 having an end connected to the first external input terminal a, a discharge resistor 20 having an end connected to the second external input terminal b, and a switch 30 connecting another end of the discharge resistor 20 to another end of the thermistor 10 or connecting the first external input terminal a to the other end of the thermistor 10, according to a control signal.

The light source driving apparatus 100 according to the present exemplary embodiment may further include an electromagnetic interference (EMI) filter unit 60 (e.g., electromagnetic interference filterer), a power converting unit 40 (e.g., power converter), and a switch controlling unit 50 (e.g., switch controller), which are connected to the first external input terminal a and the second external input terminal b.

The first external input terminal a and the second external input terminal b may have an electrical signal applied thereto from the outside. For example, external alternating current (AC) power may be input through the first external input terminal a and the second external input terminal b. The EMI filter unit 60 may serve as a filter connected to the first external input terminal a and the second external input terminal b and blocking noise. The EMI filter unit 60 may include an X capacitor, a Y capacitor, a common mode (CM) choke transformer, and a differential mode (DM) choke transformer.

The power converting unit 40 may be connected to the first external input terminal a and the second external input terminal b and may convert the power input from the outside into a power suitable for a load such as a light emitting diode (LED). Specifically, as shown in FIG. 1, the power converting unit 40 may include a rectifier 41 and a DC-DC converter 42.

The rectifier 41 may rectify AC power (for example, commercial 220V AC power) input from the outside, and may include a half-bridge structure or a full-bridge structure including a plurality of diodes. The power rectified by the rectifier 41 may be input to the DC-DC converter 42.

The selection and connection of the DC-DC converter 42 may be determined based on whether an input voltage to be converted is higher or lower than a voltage to drive the load (LED) at a desired level of operating current or the input voltage changes from a high level to a low level. For example, a buck converter may be used when the input voltage is higher than the LED voltage, and a boost converter may be used when the input voltage is lower than the LED voltage. A buck-boost converter, a power factor correction (PFC) converter, or the like may be used when the input voltage changes from a high level to a low level.

The thermistor 10, having an end connected to the first external input terminal a, prevents an instantaneous overcurrent by limiting an inrush current when an initial voltage is applied. Thus, circuit elements can be protected. When external power is applied, an output capacitor connected to an output terminal of the power converting unit 40 is in a discharged state, and accordingly, damage to the circuit elements due to excessive inrush current may occur. However, the thermistor 10 is connected to the first external input terminal a and reduces a level of inrush current at the time of power application, thereby preventing circuit damage due to overcurrent.

The thermistor 10 may be a negative temperature coefficient (NTC) thermistor. The NTC thermistor has a resistance value decreased according to a rise in temperature, such that the NTC thermistor may have high impedance at a low temperature when initially driven, thereby blocking the inrush current. In a normal state, the inrush current problem does not occur, so the thermistor 10 is not required. When operated in the normal state, the NTC thermistor has a reduction in impedance due to a rise in temperature. However, in the case of being continuously connected to an external power source, the NTC thermistor may unnecessarily consume power.

Meanwhile, the discharge resistor 20 connected to the second external input terminal b is provided to discharge a voltage charged in a capacitor therefrom when power is cut off. For example, the discharge resistor 20 may discharge the voltage charged in the X capacitor of the EMI filter unit 60 therefrom. When a capacitance of the X capacitor of the EMI filter unit 60 exceeds a predetermined level (for example, 0.5 µF), the discharge resistor 20 may be used to satisfy the standard capacitance. The discharge resistor 20 may have a high level of capacitance of several to hundreds of kΩ. The discharge resistor 20 may be disposed between the first external input terminal a and the second external input terminal b, while being connected in parallel to the X capacitor, and may consume a considerable amount of power when connected to the external power source.

That is, the thermistor 10 may only operate during initial driving, while the discharge resistor 20 may only operate when power is cut off. When the thermistor 10 and the discharge resistor 20 are connected to the external light source in a normal state, the thermistor 10 and the discharge resistor 20 may consume unnecessary power. In addition, even in a case that external power is input in an unloaded state (e.g., a standby state), it may be difficult to achieve low standby power due to the power consumed by the thermistor 10 and the discharge resistor 20.

However, the switch 30 may be further included in the present exemplary embodiment, the switch 30 having two operational contact points A and C to connect (A-B) points between the other end of the thermistor 10 and the other end of the discharge resistor 20 and (A-C) points between the other end of the thermistor 10 and the first external input terminal a, according to a control signal. In this case, the switch 30 may control connections of the external power source, the thermistor 10, and the discharge resistor 20 simultaneously.

The switch 30 may be a relay switch. When an appropriate level of current is applied to an internal coil of the relay switch, a travelling contact is moved due to a magnetic field formed around the coil, so that the relay switch may perform a switching operation.

The operation of the switch 30 may be controlled by the switch controlling unit 50.

The switch controlling unit 50 may generate a control signal for controlling the switching operation to allow the switch 30 to connect between the thermistor 10 and the discharge resistor 20 when the input power is lower than a predetermined voltage, that is, when the light source driving apparatus 100 is initially driven and the power is cut off, and to allow the switch 30 to block connection between the external power source and the thermistor 10 and the discharge resistor 20 in a normal state.

For example, the switch controlling unit 50 may detect a driving period according to the supply of external power from the voltage output from the power converting unit 40, thereby changing the operational contact points of the switch 30.

Specifically, before the switch controlling unit 50 generates the control signal, the switch 30 connects the contact points A and B to each other to allow the contact points A and C to be open. When the control signal is generated, the switch 30 connects the contact points A and C to each other to allow the contact points A and B to be open. Therefore, the connections of the external power source, the thermistor 10, and the discharge resistor 20 may be controlled according to driving periods. The operations of the switch 30 will be described in detail with reference to FIGS. 2A and 2B.

Figure 2A:
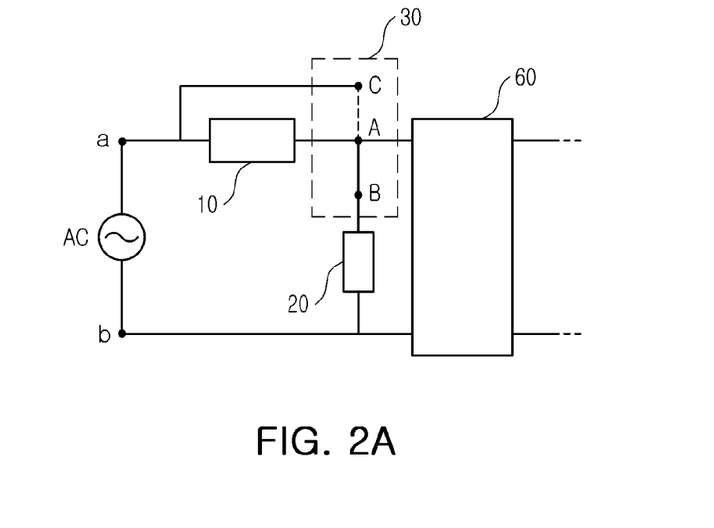
FIGS. 2A and 2B are schematic diagrams illustrating a switching operation of a switch in a light source driving apparatus according to an exemplary embodiment.
Figure 2B:
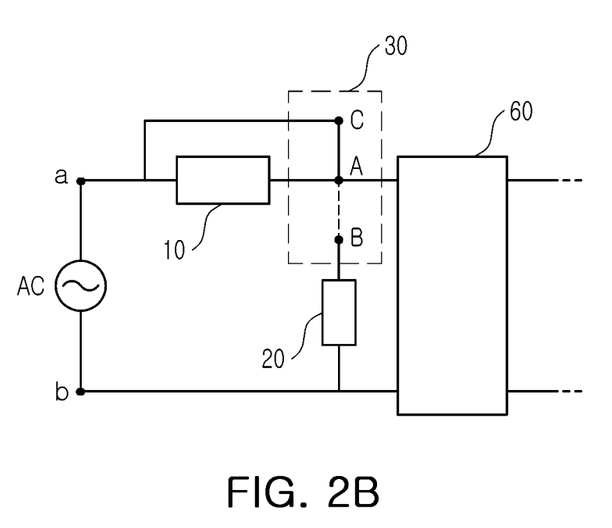

FIGS. 2A and 2B are schematic diagrams illustrating a switching operation of a switch in a light source driving apparatus according to an exemplary embodiment. Specifically, FIG. 2A shows an operating state of the switch during initial driving and power cut-off, and FIG. 2B shows an operating state of the switch in a normal state.

With reference to FIG. 2A, the switch 30 may connect the other end A of the thermistor 10 to the other end B of the discharge resistor 20 under the condition of a reference voltage or less (e.g., during initial driving and when power is cut off), and accordingly, the connection between the other end A of the thermistor 10 and the first external input terminal a and contact point C is open.

In this case, the external power source is connected to the thermistor 10 and the discharge resistor 20. When the light source driving apparatus 100 is initially driven, an inrush current is blocked by the thermistor 10, and when the power is cut off, the voltage charged in the capacitor of the EMI filter unit 60 may be discharged by the discharge resistor 20.

With reference to FIG. 2B, in the normal state, the switch 30 may connect the first external input terminal a and contact point C to the other end A of the thermistor 10, and accordingly, the connection between the other end A of the thermistor 10 and the other end B of the discharge resistor 20 is open.

Since an end of the thermistor 10 is connected to the first external input terminal a, in the case in which the switch 30 connects the other end A of the thermistor 10 to the first external input terminal a and contact point C, both ends of the thermistor 10 are connected to each other, and accordingly, current does not flow therethrough.

In addition, since the other end A of the thermistor 10 is connected to the first external input terminal a and contact point C, the other end B of the discharge resistor 20 and the other end A of the thermistor 10 are separated from each other. That is, due to the switching operation of the switch 30 illustrated in FIG. 2B, the connection between the external power source and the thermistor 10 and the connection between the thermistor 10 and the discharge resistor 20 may be simultaneously blocked in the normal state.

Therefore, according to the present exemplary embodiment, the single switch 30 is used to connect the external power source to the thermistor 10 and the discharge resistor 20 during initial driving and power cut-off, while blocking the connection between the external power source and the thermistor 10 and the connection between the thermistor 10 and the discharge resistor 20 in the normal state, so that such a simplified circuit operation may prevent unnecessary power consumption caused by the thermistor 10 and the discharge resistor 20 in the normal state. Therefore, a light source driving apparatus 100 having superior power efficiency may be provided.

Figure 3:
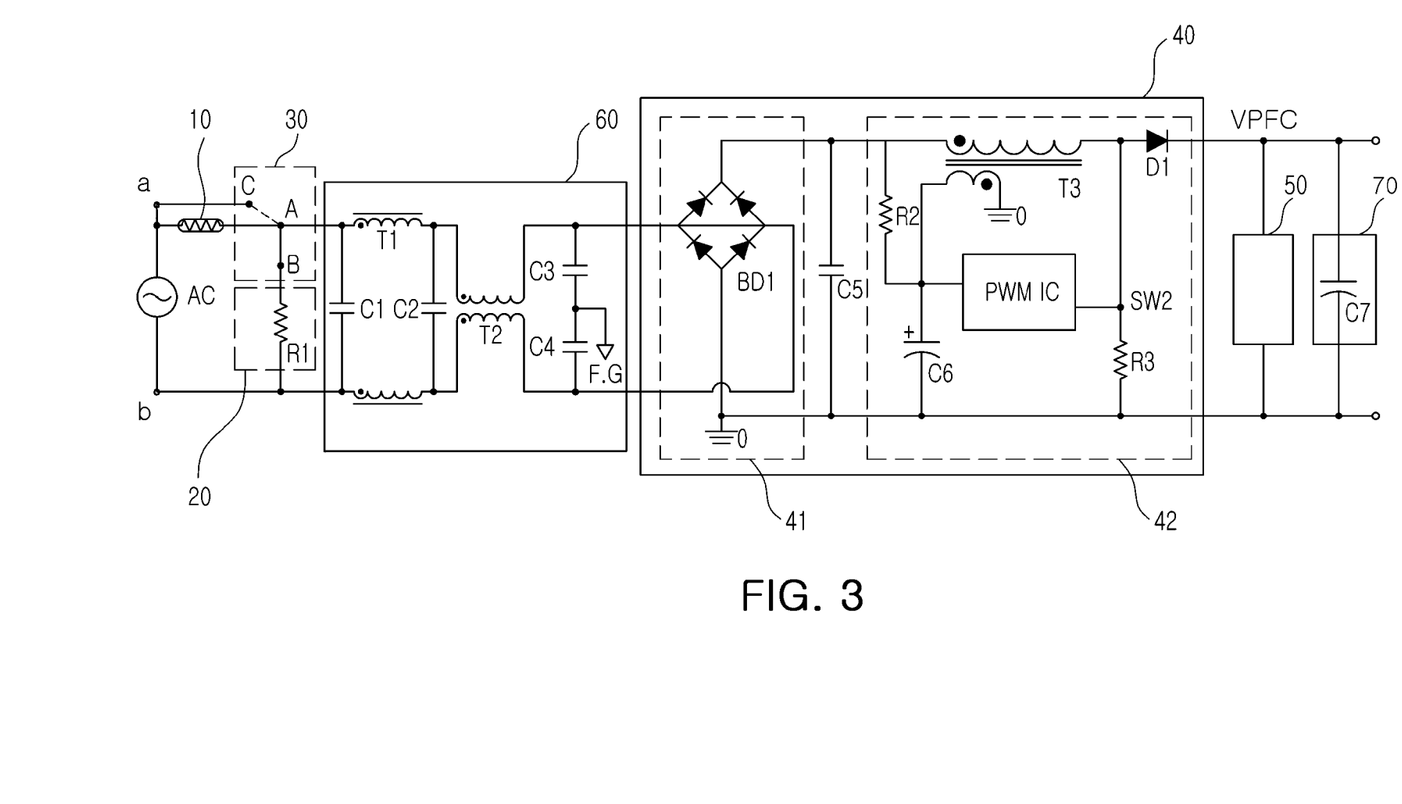
FIG. 3 is a schematic circuit diagram illustrating a light source driving apparatus according to an exemplary embodiment.

FIG. 3 is a schematic circuit diagram illustrating a light source driving apparatus 101 according to an exemplary embodiment of the present invention. In particular, the light source driving apparatus 100, for example, of FIG. 1 is described in more detail with reference to FIG. 3.

With reference to FIG. 3, a light source driving apparatus 101 according to an exemplary embodiment may include a first external input terminal, a second external input terminal b, a thermistor 10 connected to the first external input terminal a, a discharge resistor 20 connected to the second external input terminal b, and a switch 30 interposed between the thermistor 10 and the discharge resistor 20 to control a connection with an external power source AC. In addition, the light source driving apparatus 101 may further include an EMI filter unit 60 (e.g., EMI filterer), a power converting unit 40 (e.g., power converter), and a switch controlling unit 50 (e.g., switch controller), which are connected to the first external input terminal a and the second external input terminal b.

In the present exemplary embodiment, a full bridge diode is used as a rectifier 41 of the power converting unit 40, a PFC converter is used as the DC-DC converter 42 of the power converting unit 40, and a relay switch is used as the switch 30. Since the operations and configurations of the EMI filter unit 60, the power converting unit 40, the switch controlling unit 50, and an output capacitor 70 are described in the above exemplary embodiment with reference to FIG. 1, a detailed description thereof will be omitted herein.

With regard to the operating state of the switch 30, when external power is applied through the first external input terminal a and the second external input terminal b during initial driving, the switch 30 maintains connection between the other end A of the thermistor 10 and the other end B of the discharge resistor 20. Accordingly, current input from the external power source AC passes through the thermistor 10 and the discharge resistor 20, whereby an inrush current during initial driving may be blocked by the thermistor 10 connected to the first external input terminal a.

The current input from the first external input terminal a and the second external input terminal b is transmitted to the EMI filter unit 60 through the thermistor 10, and power from which noise is removed after passing through the EMI filter unit 60 is input to the power converting unit 40. The rectifier 41 of the power converting unit 40 may rectify the input AC power and convert the input AC power to DC power. The converted voltage may be charged in a capacitor C5 connected to an output terminal of the rectifier 41. The voltage charged in the capacitor C5 may be a DC voltage including ripple components.

In FIG. 3, the PFC converter is used as the DC-DC converter connected to the output terminal of the rectifier 41. However, it is understood that one or more other exemplary embodiments are not limited thereto. As described above, various types of DC-DC converters may be used therefor.

As in the present exemplary embodiment, when the PFC converter is used as the DC-DC converter 42, the voltage may be charged in the capacitor C5 and be simultaneously charged in a Vcc electrolytic capacitor C6 of a pulse width modulation integrated circuit (PWM IC) after passing through a resistor R2 of the DC-DC converter 42. When the voltage of the electrolytic capacitor C6 reaches a threshold voltage of the PWM IC, a pulse is generated to control on/off switching of a switch SW2 of the DC-DC converter 42 and the voltage is charged in the output capacitor 70.

The output capacitor 70 may be connected to the output terminal of the power converting unit 40 to be charged with the voltage output from the power converting unit 40, such that DC voltage including less ripple components may be supplied to the load (e.g., LED) as a driving voltage. In the present exemplary embodiment, the voltage charged in the output capacitor 70 may be higher than the external input voltage in order to correct power factors.

When a level of the input voltage is equal to or higher than a predetermined level, the switch controlling unit 50 may transmit a control signal to the switch 30. In this case, the level of the input voltage may be detected from the output voltage of the power converting unit 40. For example, it may be measured from the voltage charged in the output capacitor 70. However, it is understood that one or more other exemplary embodiments are not limited thereto. The level of the input voltage and driving periods associated therewith may be detected at several points using various methods known in the art.

When the level of the input voltage reaches a predetermined level (e.g., normal state), the switch controlling unit 50 may transmit the control signal for changing the operational contact points of the switch 30 to the switch 30. Accordingly, the switch 30 allows the connection between the thermistor 10 and the discharge resistor 20 to be open and connects the other end of the thermistor 10 to the first external input terminal a, such that the switch 30 may block the connection between the external power source AC and the thermistor 10 and the connection between the thermistor 10 and the discharge resistor 20.

In this case, the first external input terminal a and the second external input terminal b are directly connected to the EMI filter unit 50 through the contact points A and C, and accordingly, the power consumption in the thermistor 10 and the discharge resistor 20 may be blocked.

Then, when the supply of external power is blocked and the level of the input voltage is equal to or lower than a predetermined level, the switch controlling unit 50 may transmit a control signal to the switch 30. As described above, the driving period according to the level of the input voltage may be detected from the level of the voltage charged in the output capacitor 70.

The switch 30 changes the operational contact point to B according to the control signal input from the switch controlling unit 50, and accordingly, the discharge resistor 20 is connected to the EMI filter unit 60, thereby allowing the voltage charged in the X capacitor C1 of the EMI filter unit 60 to be discharged therefrom.

That is, according to the present exemplary embodiment, the driving period is detected from the value of the voltage charged in the output capacitor 70, and the connection between the external power source AC and the thermistor 10 and the connection between the thermistor 10 and the discharge resistor 20 may be effectively controlled using the single switch 30 at the same time.

Figure 4:
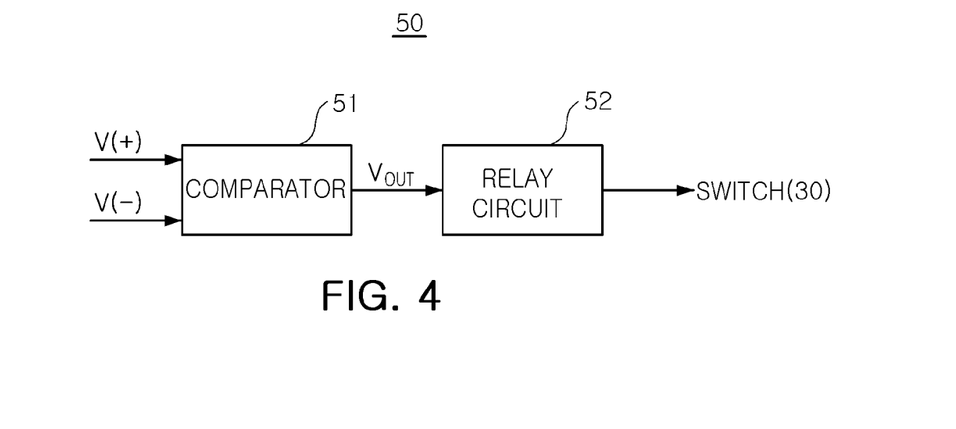
FIGS. 4 and 5 are schematic diagrams illustrating the configuration of a switch controlling unit in the light source driving apparatus of FIG. 3.
Figure 5:
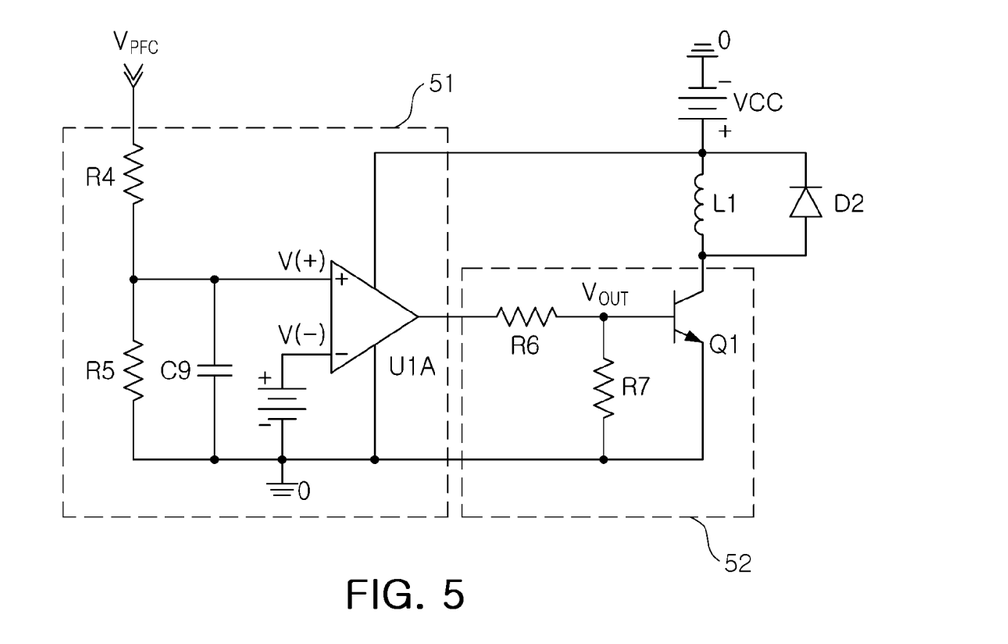

FIGS. 4 and 5 are schematic diagrams illustrating the configuration of a switch controlling unit in the light source driving apparatus of FIG. 3. Specifically, FIG. 4 is a block diagram of the switch controlling unit applied to the light source driving apparatus of FIG. 3, and FIG. 5 is a circuit diagram of the switch controlling unit applied to the light source driving apparatus of FIG. 3.

With reference to FIGS. 4 and 5, the switch controlling unit 50 may include a comparator 51 and a relay circuit 52. The comparator 51 compares a reference signal V(−) with a detection signal V(+), thereby outputting a control signal Vout. The relay circuit 52 receives the control signal Vout and transmits the control signal Vout to the switch 30.

The comparator 51 may include voltage dividing resistors R4 and R5 connected to the output terminal of the power converting unit 40 and dividing a voltage VPFC output from the power converting unit 40, a capacitor C9 removing noise in an overcurrent state, and an operational amplifier (op-amp) U1A. The op-amp U1A compares the detection signal V(+) generated in part of the voltage VPFC output from the power converting unit 40 with the predetermined reference signal V(−), and transmits the comparison results to the relay circuit 52. Here, the detection signal V(+) may be in the form of the voltage divided by the voltage dividing resistors R4 and R5 connected to the output terminal of the power converting unit 40.

The relay circuit 52 may include voltage dividing resistors R6 and R7 dividing the output of the comparator 51 and a transistor Q1 driving a coil L1 of the relay circuit. A diode D2 connected in parallel to the coil L1 may serve as a freewheeling diode preventing a spike voltage due to counter electromotive force generated during on/off switching of the transistor Q1. However, the configuration of the switch controlling unit 50 is not limited to that illustrated in FIGS. 4 and 5. Any controlling unit (i.e., controller) may be used as the switch controlling unit 50 as long as the controlling unit can control the operations of the switch 30 according to the driving periods thereof.

Figure 6:
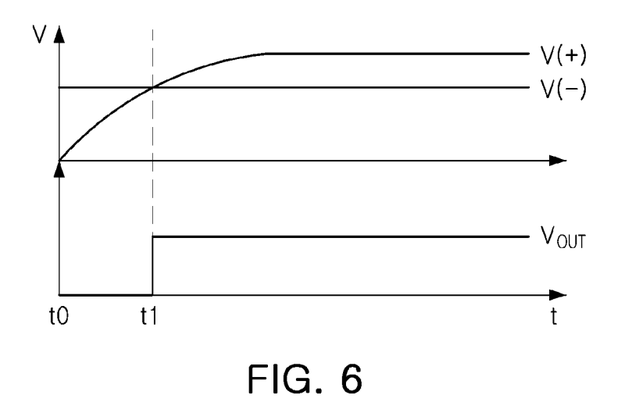
FIG. 6 is a graph illustrating input and output voltage waveforms of the switch controlling unit of FIG. 5.

FIG. 6 is a graph illustrating input and output voltage waveforms of the switch controlling unit 50 of FIG. 5.

With reference to FIG. 6, the reference signal V(−) input to the comparator 51 is maintained at a constant level, while the detection signal V(+) detected from the external voltage (in the present exemplary embodiment, the voltage output from the power converting unit 40) increases gradually after the application of power. That is, a level of the detection signal V(+) is lower than that of the reference signal V(−) when power is initially applied (t0–t1). At this time, the comparator 51 may not output the control signal or may output a low signal.

Meanwhile, after a lapse of a period of time (e.g., predetermined period of time) after power supply, the level of the detection signal V(+) is higher than that of the reference signal V(−). At this time, the comparator 51 may output the control signal Vout or may output a high signal, thereby allowing the operational contact point of the switch 30 to be changed.

Further, when the external power is cut off, the input voltage becomes 0, and in the case of the present exemplary embodiment, the voltage charged in the output capacitor 70 may gradually decrease. Therefore, when the level of the detection signal V(+) falls to be lower than that of the reference signal V(−), the comparator 51 may not output the control signal or may output the low signal, thereby allowing the first external input terminal a and the second external input terminal b to be connected to the discharge resistor 20 and causing the voltage charged in the output capacitor 70 to be discharged by the discharge resistor 20.

Figure 7:
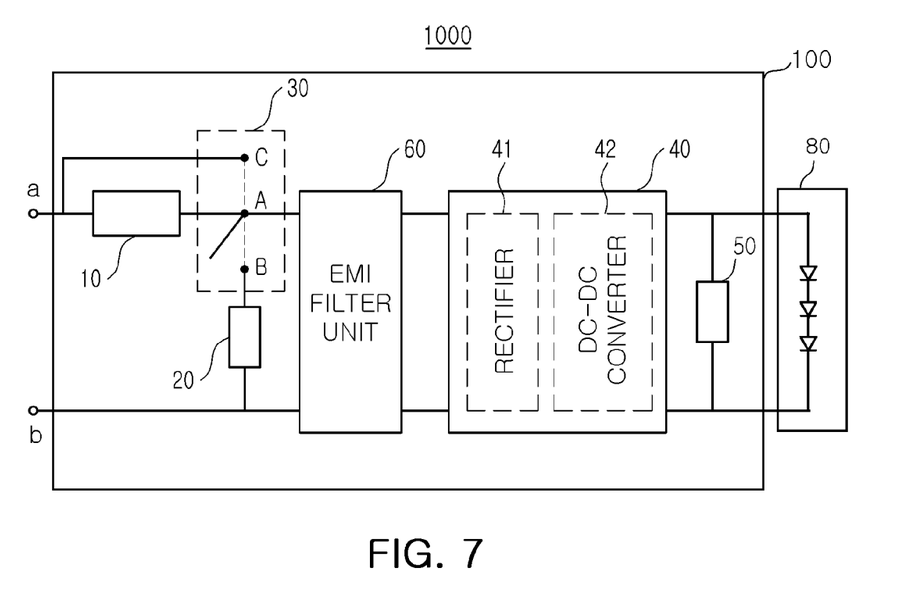
FIG. 7 is a schematic diagram illustrating a light source device according to an exemplary embodiment.

FIG. 7 is a schematic diagram illustrating a light source device 1000 according to an exemplary embodiment. Specifically, FIG. 7 shows that a light source unit 80 (e.g., light source) is applied to a light source driving apparatus 100 according to an exemplary embodiment.

With reference to FIG. 7, a light source device 1000 according to an exemplary embodiment may include the light source driving apparatus 100 including the first external input terminal a, the second external input terminal b, the thermistor 10, the discharge resistor 20, and the switch 30, and the light source unit 80 including at least one LED.

An end of the thermistor 10 may be connected to the first external input terminal a and an end of the discharge resistor 20 may be connected to the second external input terminal b. The switch 30 may connect another end of the discharge resistor 20 to another end of the thermistor 10, or connect the first external input terminal a to the other end of the thermistor 10, according to a control signal.

In the light source device 1000 according to the present exemplary embodiment, the light source driving apparatus 100 may further include the EMI filter unit 60, the power converting unit 40, and the switch controlling unit 50, which are connected to the first external input terminal a and the second external input terminal b. The light source driving apparatus 100 may be similar to the light source driving apparatuses 100 and 101 described above with reference to FIGS. 1 through 3, and accordingly, a detailed description thereof will be omitted herein.

The light source unit 80 may include at least one LED as a light source. In a case in which the light source unit 80 includes a plurality of LEDs, the plurality of LEDs may be arrayed to have various electrical connections, such as serial connections, parallel connections, or serial and parallel connections, and be driven as a single unit. FIG. 7 shows that three LEDs are connected in series, but the connection of LEDs is not limited thereto. The plurality of LEDs are arrayed to have various electrical connections.

In the light source device 1000 according to the present exemplary embodiment, the light source driving apparatus 100 may include the thermistor 10 preventing an inrush current during initial driving and the discharge resistor 20 allowing the capacitor to be discharged when the power is cut off, while allowing the connection between the thermistor 10 and the discharge resistor 20 to be blocked in a normal state, whereby a light source device having improved power efficiency and being stably driven can be provided.

Furthermore, according to an exemplary embodiment, a light source driving method of a light source driving apparatus including a first external input terminal, a second external input terminal, a thermistor with an end connected to the first external input terminal, a discharge resistor with an end connected to the second external input terminal, and a switch, includes: connecting, by the switch, another end of the discharge resistor to another end of the thermistor in response to a first control signal for controlling a connection between the other end of the discharge resistor to the other end of the thermistor; and connecting, by the switch, the first external input terminal to the other end of the thermistor in response to a second control signal for controlling a connection between the first external input terminal to the other end of the thermistor As set forth above, according to exemplary embodiments, a light source driving apparatus can achieve high power efficiency with a simplified structure.

According to exemplary embodiments, a light source device can have improved high power efficiency and be stably driven.

While exemplary embodiments been shown and described above, it will be apparent to those skilled in the art that modifications and variations can be made without departing from the spirit and scope of the present inventive concept as defined by the appended claims.

What is claimed is:

1. A light source driving apparatus, comprising:
   a first external input terminal and a second external input terminal;
   a thermistor with an end connected to the first external input terminal;
   a discharge resistor with an end connected to the second external input terminal; and
   a switch which selectively connects, according to a control signal, another end of the discharge resistor to another end of the thermistor or the first external input terminal to the other end of the thermistor.

2. The light source driving apparatus of claim 1, wherein:
   the first external input terminal and the other end of the thermistor are open in response to the switch connecting, according to the control signal, the other end of the discharge resistor to the other end of the thermistor; and
   the other end of the discharge resistor to the other end of the thermistor are open in response to the switch connecting, according to the control signal, the first external input terminal to the other end of the thermistor.

3. The light source driving apparatus of claim 1, wherein the switch connects the first external input terminal to the other end of the thermistor in a normal state, thereby disconnecting the thermistor and the discharge resistor from an external power source.

4. The light source driving apparatus of claim 1, wherein the switch connects the other end of the discharge resistor to the other end of the thermistor in response to a voltage of power input through the first external input terminal and the second external input terminal being equal to or lower than a reference voltage.

5. The light source driving apparatus of claim 1, further comprising an electromagnetic interference (EMI) filterer connected to the first external input terminal and the second external input terminal.

6. The light source driving apparatus of claim 5, wherein:
the EMI filterer comprises a capacitor connected between the first external input terminal and the second external input terminal; and
the capacitor is connected in parallel to the discharge resistor according to an operation of the switch.

7. The light source driving apparatus of claim 1, further comprising a power converter connected to the first external input terminal and the second external input terminal.

8. The light source driving apparatus of claim 7, wherein the power converter comprises a rectifier and a DC-DC converter connected in parallel to each other between the first external input terminal and the second external input terminal.

9. The light source driving apparatus of claim 8, wherein the DC-DC converter is a power factor correction (PFC) converter.

10. The light source driving apparatus of claim 1, further comprising a switch controller connected to the first external input terminal and the second external input terminal and which controls an operation of the switch.

11. The light source driving apparatus of claim 10, wherein the switch controller comprises:
a comparator which compares a reference signal with a detection signal detected from a voltage input through the first external input terminal and the second external input terminal and which generates the control signal according to the comparing; and
a relay circuit which controls the switch according to the control signal generated by the comparator.

12. The light source driving apparatus of claim 11, further comprising:
a power converter connected to the first external input terminal and the second external input terminal,
wherein the detection signal has a form of voltage divided by a plurality of resistors connected to an output terminal of the power converter.

13. The light source driving apparatus of claim 10, further comprising:
an output capacitor connected in parallel to the switch controller,
wherein the switch controller controls an operation of the switch according to a level of voltage charged in the output capacitor.

14. The light source driving apparatus of claim 1, wherein the switch is a relay switch.

15. A light source device, comprising:
a light source driving apparatus comprising:
a first external input terminal and a second external input terminal,
a thermistor with an end connected to the first external input terminal,
a discharge resistor with an end connected to the second external input terminal, and
a switch which selectively connects, according to a control signal, another end of the discharge resistor to another end of the thermistor or the first external input terminal to the other end of the thermistor; and
a light source driven by power output from the light source driving apparatus and comprising at least one light emitting diode (LED).

16. A light source driving method of a light source driving apparatus comprising a first external input terminal, a second external input terminal, a thermistor with an end connected to the first external input terminal, a discharge resistor with an end connected to the second external input terminal, and a switch, the method comprising:
connecting, by the switch, another end of the discharge resistor to another end of the thermistor in response to a first control signal for controlling a connection between the other end of the discharge resistor to the other end of the thermistor; and
connecting, by the switch, the first external input terminal to the other end of the thermistor in response to a second control signal for controlling a connection between the first external input terminal to the other end of the thermistor.

17. The method of claim 16, wherein:
the first external input terminal and the other end of the thermistor are open in response to the switch connecting, according to the first control signal, the other end of the discharge resistor to the other end of the thermistor; and
the other end of the discharge resistor to the other end of the thermistor are open in response to the switch connecting, according to the second control signal, the first external input terminal to the other end of the thermistor.

18. The method of claim 16, wherein the switch connects the first external input terminal to the other end of the thermistor in a normal state, thereby disconnecting the thermistor and the discharge resistor from an external power source.

19. The method of claim 16, wherein the connecting, by the switch, of the other end of the discharge resistor to the other end of the thermistor comprises connecting, by the switch the other end of the discharge resistor to the other end of the thermistor in response to a voltage of power input through the first external input terminal and the second external input terminal being equal to or lower than a reference voltage.

20. The method of claim 16, further comprising selectively generating the first control signal or the second control signal according to a comparison between a reference signal and a detection signal detected from a voltage input through the first external input terminal and the second external input terminal.

* * * * *